Figure 1:
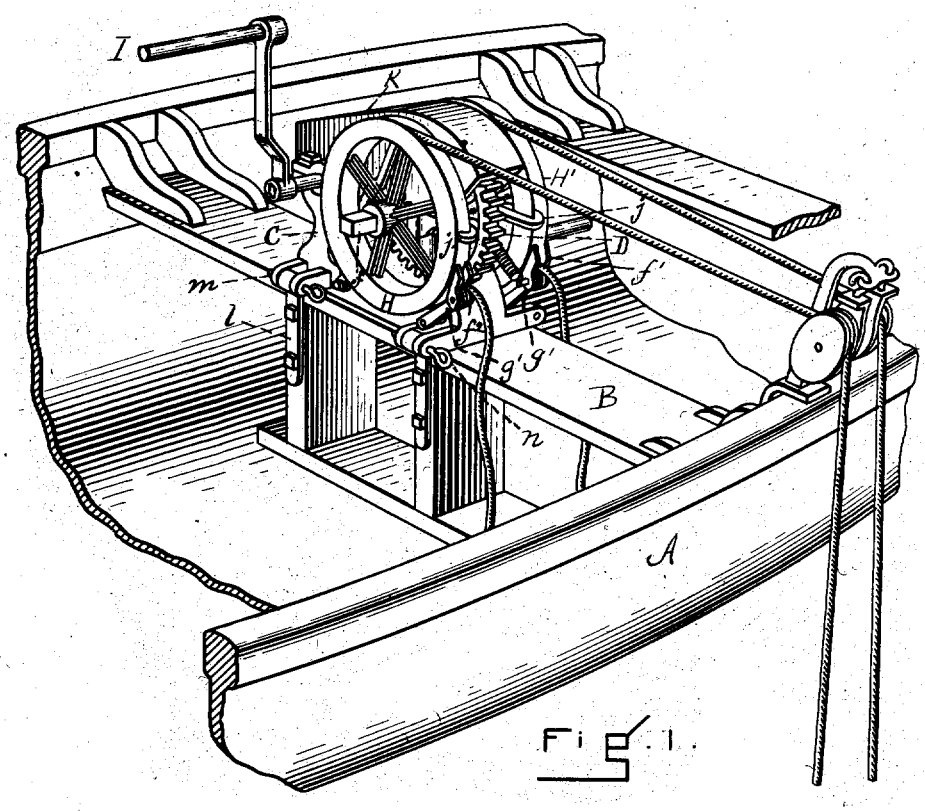

W. B. LANTZ.

ROPE HAULING MACHINE.

No. 11,628. Reissued Sept. 7, 1897.

WITNESSES

A. A. Bonney

C. G. Grayson

INVENTOR

William B. Lantz

By his Atty

Henry W. Williams

UNITED STATES PATENT OFFICE.

WILLIAM B. LANTZ, OF GLOUCESTER, MASSACHUSETTS.

ROPE-HAULING MACHINE.

SPECIFICATION forming part of Reissued Letters Patent No. 11,628, dated September 7, 1897.

Original No. 531,318, dated December 25, 1894. Application for reissue filed April 6, 1896. Serial No. 586,456.

*To all whom it may concern:*

Be it known that I, WILLIAM B. LANTZ, a citizen of the United States, residing at Gloucester, in the county of Essex and State of Massachusetts, have invented certain new and useful Improvements in Machines for Hauling Purse-Lines of Seines; and I do hereby declare the following to be a full, clear, and exact description of the invention, such as will enable others skilled in the art to which it appertains to make and use the same.

My invention relates to improvements in machines mounted in fishing-boats or like floating bodies for hauling the purse-lines of seines.

The invention consists in a purse-line-hauling machine for use in a seine-boat provided with crane-supported purse-line-guiding blocks and a firm seat adapted for serving for rowers to sit upon and also as a firm hinging support for the purse-line power hauling-machine to be mounted upon, said purse-line power hauling-machine being of substantially the construction hereinafter described, and mounted on, hinged, and fastened to said seat and its hauling-wheels arranged in suitable relation to the crane-supported guiding-blocks, which serve as guiding means for the purse-lines in their movement toward the machine. By this part of my invention the purse-lines of a seine can be hauled in and the seine pursed and drawn up to the boat and then the purse-lines taken out of the machine and fastened to cleats of the boat and the machine turned down out of the way, so that the seine may be drawn in the boat and over the seats by hand without obstruction from the machine, and then the rowers can sit upon the said seat and row the boat without any obstruction from the machine, and when the seine is reset the machine can be raised up to its hauling position upon the seat, fastened in position, and the purse-lines put into it for another hauling operation, or the machine may, if ever so desired, be removed entirely from its connections with the seat and hoisted into the receiving vessel and the boat remain complete without it, and when the machine is turned down out of the way the supporting-seat to which it is attached will be complete of itself, ready for the rowers to sit upon, and after the machine is turned down on its hinges not requiring an auxiliary part to make the seat complete at the point where the power-machine is mounted when adjusted for hauling in the purse-lines of the seine.

The invention also consists of a purse-line power hauling-machine for use in a seine-boat provided with crane-supported purse-line-guiding tackle-blocks comprising a frame, gear-wheels, and grooved frictional biting hauling-wheels, said machine being mounted on one of the seats of the boat and hinged to the seat at the forward edge thereof and also suitably fastened to the seat at the aft edge thereof by a means that can be readily manipulated to unfasten the machine at the aft edge of the seat, so that it may be turned down forward of the seat.

The invention also consists in the combination, with a machine-framework, of operating toothed gearing mounted on the same, grooved wheels mounted on a shaft and arranged on each side of the gearing and operated thereby, improved means for retaining the purse-lines, while being hauled in, in said grooves, and means for locking the gearing.

It also consists in providing the power-machine with double separable hinges by which it is removably attached to the boat-seat, but may be turned down into the same at the forword edge of the seat by separating the hinges on one edge and turning the machine down on the opposite edge of the seat.

It also consists in certain other novel constructions, combinations, and arrangements of parts, as will be hereinafter more particularly set forth and claimed.

Figure 2:
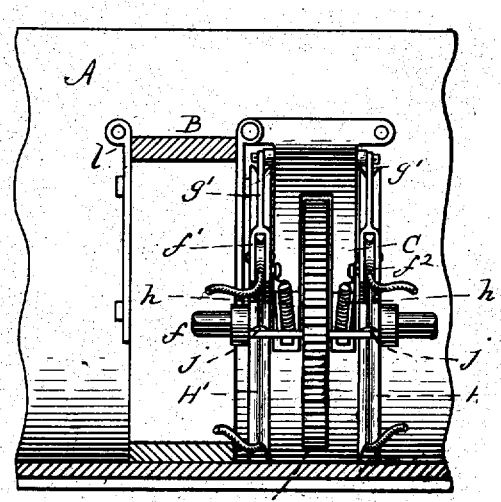
Figure 3:
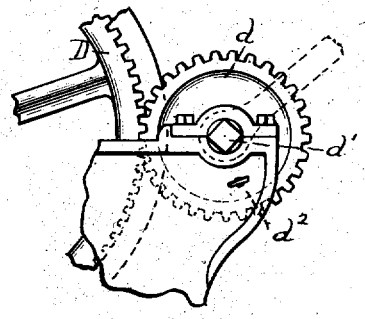

In the accompanying drawings, Figure 1 is a perspective view, partly broken away, of a boat containing my purse-line-hauling machine attached to the seat thereof. Fig. 2 is a detail section through the boat and an end elevation of the hauling-machine turned down in the boat; and Fig. 3 is a detail side elevation of two toothed gears, showing a pin for locking the same.

A in the drawings is a boat; B, a seat thereof; C, a power hauling-machine; D, a large gear or toothed wheel mounted in a frame, and H H′ grooved purse-line-hauling wheels mounted on an arbor *f* of the gear or toothed wheel.

The gear or toothed wheel is located between two upwardly-extending standards $c\ c'$ of the frame of the machine C, and its arbor $f$ extends through bearings in said standards $c\ c'$ and carries on each end one of the grooved purse-line-hauling wheels H H', the construction and arrangement being such that the toothed wheel D is intermediate the wheels H H'. These wheels are provided at their peripheries with V-shaped grooves into which the purse-lines pass from any suitable crane-supported tackle-blocks A' A', mounted on the edge of the boat. The purse-lines $A^2\ A^2$ pass over the tops of said wheels H H' and are wedged into the grooves of the same, and may be held snugly therein by spring-pressed sheaves $f^2$, pivoted on the frame of the power-machine. The free ends of the purse-lines are paid off at the lower portions of the wheels H H', descend into the boat, and lie loosely upon the bottom thereof. The sheaves $f^2$ are each supported by a pivoted bar $g'$, bifurcated at its outer end to form a yoke $f'$, in the bottom of which the said sheaves $f^2$ are journaled. Springs $h$ are connected, respectively, to the bars $g'$ and to the frame of the power-machine, and the sheaves $f^2$ are thus pressed tightly against the purse-lines and made to hold them firmly in the V-grooves.

Just in the rear of the gear-wheel D and meshing therewith is mounted another and smaller gear or toothed wheel $d$ by means of an arbor $d'$, supported by the frame. Both the arbors $f$ and $d'$ are squared at each end, so that crank-handles I can be attached to either to operate the devices. If applied to the arbor $d'$, greater power is gained; but with a loss of speed. If applied to the arbor $f$, more speed is secured, but the power is decreased.

Two fingers or claws $j\ j$ are attached to the frame, so as to enter the V-shaped grooves of the wheels H H' just above the sheaves $f^2$, and thus remove or free the purse-lines if they should stick in said grooves and cause them to drop into the bottom of the boat, the purse-lines being guided in dropping by the yokes $f'$ of the bars $g'$.

The gear $d$ is provided near its periphery with an aperture which is adapted to coincide with apertures cut in the frame, so that a locking-pin $d^2$ can be slipped through all of said apertures when they coincide, and thus lock the gear $d$, and consequently all the rest of the mechanism, making the machine safe and convenient to handle.

A protecting cover or housing K, composed, preferably, of wooden sides and a metal top, is attached to the frame, so as to protect the gears and prevent anything from becoming entangled in them.

At each end or side of the base of the frame of the power-machine are projecting apertured lugs formed in pairs, and these, with headed apertured shanks I, adapted to be attached to vertical partitions or supports under the seat, constitute hinges, each apertured head being adapted to be removably secured between its respective pair of lugs by pins $n$, which are passed through the lugs and said heads.

By having the grooved wheels H H' set far apart there is no danger of the purse-lines becoming entangled or jumping from one grooved wheel to the other, and the purse-lines will pass in straight lines from the crane-supported tackle-blocks A' A', and in the event of the seine fouling one line can be detached and the other drawn in alone. I regard the guiding of the purse-lines as an important feature of my invention.

It will be understood that as the purse-lines are hauled in by the grooved wheels H H' it is essential that the purse-lines wedge tightly into the V-grooves of said wheels in order that there will be sufficient frictional contact between the lines and the wheels to insure a bite, which will prevent the lines slipping on the wheels while the hauling operation is proceeding. Hence it is that the grooves of the wheels are made in approximately V shape and that the sheaves are provided and are located below and far in advance of or beyond the arbor $f$ of the wheels D and H H'.

It is important that the seat of the boat in which the power-machine C is mounted and operated should be firmly sustained, and hence strong uprights or partitions rising from a base-board fastened to the bottom of the boat are constructed under the seat, and also that the uprights serve as supports for hinges and fastening means whereby the power-machine when mounted on the seat can be hinged and fastened in position and manipulated as occasion requires.

When it is desired to get the purse-line-hauling machine out of the way, which is the case when the boat is being towed and when the seine has to be hauled into the boat and over the tops of the seats, the hauling-machine is unfastened at the aft edge of the seat and the machine swung down on a hinge at the forward edge, so as to be in rear of and out of the way of the rowers, who always face the aft part of the boat while rowing.

The novelty and importance of my purse-line-hauling device will be readily seen when it is considered that previous to my invention thereof purse-lines were hauled in directly by hand instead of by a machine operated by the men on a fishing-boat. The direct hand-hauling of the purse-lines was laborious and unsatisfactory and often much loss was experienced.

The invention of constructing a fishing-boat with a power hauling-machine applied to its seat is broadly new, and the applying of such a machine to the boat so that it can be moved down on a hinge on the forward edge of the seat out of the way to allow the seine to be drawn over the tops of the seats and also out of the way of the rowers while rowing the boat is very important, for the reason that there is no spare room in a seine-boat, the seats being all occupied by the men while rowing and the remainder of the boat by the seine. A machine to do the work must of necessity be made very strong, and consequently quite heavy, and while this is the case it must be quickly adjusted, for when the fish are in the seine the men must work quick in order not to lose them, and the power-machine must be moved out of the way when not in use for hauling the purse-lines, so as not to interfere with the other work that must be done in the boat. To attain all these ends, it required invention, first, to make the discovery and then to apply the same so that it could be used to advantage, and one great feature in the contrivance was the hinging of the machine to the seat at the forward edge and fastening it down at the aft edge by a fastening which could be conveniently unfastened. By the means shown my invention is carried out in what I regard as the best manner, but this form may be changed in equivalent ways without departing from the principle thereof.

My invention enables me to furnish a machine heavy enough to stand the strain to which it is subjected, yet easily handled by one man, readily placed in position ready for use in a very few seconds, also adjusted out of the way in as short a time, and by throwing a piece of canvas over it the seine may be dragged over the seats without any one hardly knowing that there is a machine in the boat.

In order to have my invention more fully understood, I will give a statement of the operation of setting and hauling a seine by it, which operation is as follows: The length of the seine operated by my machine is, say, from twelve hundred to fourteen hundred feet, the width from ninety to one hundred and twenty feet. On the top part corks are fastened to float it. On the bottom leads are placed to sink it. To the bottom, rings are also fastened at equal distances apart, through which the purse-lines are led. When a school of fish is sighted, (usually from the mast-head,) the men get in the seine-boat and row, oftentimes several miles. When near enough to the fish, the end of the seine is thrown out. A keg is fastened to this end, to which the purse-line is tied. As the boat is being rowed around in a circle the remainder of the seine is thrown out, one man throwing the corks and another man throwing the seine. The man in the "dory" picks up the keg and throws it into the boat when it gets around. In this condition the seine is like a long net, standing straight up and down in the water, fourteen hundred feet in circumference and one hundred and twenty feet deep, being floated on top by the corks, and the purse-line through the rings on the bottom, with both ends in the boat. Both ends of the purse-lines are put into the machine and hauled in and the seine closed together on the bottom. When it is all closed, the rings are hauled up, the purse-lines taken out of the machine and made fast to cleats on the boat, and the power-machine turned downward out of the way and covered over with a piece of canvas. Now we have both ends and the bottom of the seine and commence to haul the seine into the boat, the fish being trapped in the remaining part of the seine in the water. As we keep hauling in the seine the fish are confined to closer quarters, and, finally, when we get them into a small compass the receiving vessel comes up to the boat and the fish are bailed onto the vessel's deck from the seine, and the seine is then all hauled into the seine-boat.

When the seine is hauled into the seine-boat, it is thrown in a rough-and-tumble manner from one end of the boat to the other over seats and everything. Now they commence in about the middle of the boat and haul the front part of the seine, which has been thrown over the seats, back into the after part of the boat. If the power-machine was allowed to remain on top of the seat, it would seriously interfere with hauling the seine over the seats, or if placed in any part of the boat as a stationary fixture it would interfere with the work which must be done in the boat; but by simply turning it down it is taken out of the way and no inconvenience is experienced and the work is allowed to go on. The seat is also left clear for two men to sit on to row. When the seine has been hauled from the forward to the after part of the boat and the end reached, the boat is taken alongside the vessel and the seine hauled from the boat across a roller onto the deck of the vessel. Then it is hauled back again onto the boat and laid across from one side to the other, with the corks all separate on one side, all ready for the next set. This is termed by the fishermen "making the seine on."

By making the hinges separable and providing for swinging the machine up and down on a hinge at the forward edge of the seat and for fastening the machine down at the aft edge of the seat, the machine, which weighs about one hundred and eighty pounds, can be entirely removed from its base—the seat—and hoisted from the seine-boat into the receiving vessel in going long distances or in storms for the purpose of either lightening the seine-boat in towing it or to save the machine from being lost in the event of the seine-boat being lost. It is not intended ever to swing the machine on the forward hinge, as it would be in the way of the rowers if swung down aft of the seat, and the hinge construction of the aft fastening is only adopted because it is a good form of strong aft reliable fastening for the purpose stated.

What I claim as my invention is—

1. For use on a seine-boat and to be operated in connection with crane-supported tackle-blocks for guiding and controlling the purse-lines of a seine, a power-machine adapted for hauling in the purse-lines of seines, said machine comprising a frame, toothed gear-wheel, grooved frictional biting-wheels on each side of the gear-wheel, and means by which it may be mounted upon a support in the boat and removed from said support as occasion requires, substantially as described.

2. For use on a seine-boat and to be operated in connection with crane-supported tackle-blocks for guiding and controlling purse-lines of seines, a power-machine adapted for hauling in the purse-lines of seines, said machine comprising a frame, toothed gear-wheel and grooved frictional biting hauling-wheels, and means by which the purse-lines are held in position and prevented from dropping off the grooved wheels, and means for removing the purse-lines from the grooved wheels, said machine being adapted to be hinged at its front to one of the seats of the boat, mounted upon such seat, and fastened at the aft edge of the seat, the whole construction being such that the purse-lines can be guided and hauled in, and the seine drawn up to the boat by the power-machine, and the seine thereby pursed; the purse-lines taken out of the hauling-machine, and said machine then unfastened at the aft edge of the seat and turned down at the forward edge of the same, and the pursed seine drawn by hand over the seats of the boat without obstruction from the machine, and the machine again mounted on the seat for a rehauling of the purse-lines of the seine, substantially as described.

3. For use on a seine-boat having seats, a purse-line power hauling-machine, comprising a frame, intermediate toothed gear-wheels, and grooved, frictional biting hauling-wheels, on each side of the gear-wheels; said machine being adapted to be mounted on a seat of the boat, and hinged to the seat at one edge thereof, and suitably fastened to the seat at the other edge, substantially as described.

4. A purse-line-hauling machine comprising, in combination, a framework, a supporting-base in the form of a boat-seat, and provided with strong uprights and supporting-partitions; toothed gearing mounted upon the same, grooved purse-line-hauling wheels mounted on each side of the gearing and operated thereby, purse-line-pressing sheaves, pivoted supporting-bars having bifurcated ends in which the sheaves are journaled, springs connected to said pivoted bars and the frame, whereby the sheaves are pressed against the purse-lines in the grooved drums or wheels, and caused to pass almost completely around the said wheels, and are retained in said grooves; and fingers or claws for freeing the purse-lines from the grooves of the wheels; said bifurcated bars guiding the purse-lines as they pass from the hauling-wheels; and a device for locking the gearing, substantially as described.

5. A purse-line-hauling machine provided with separable hinges removably secured at its opposite edges to a supporting-seat of a boat, said hinges consisting of spaced apertured lugs located on the frame, apertured shanks secured to the supporting-seat, and adapted to engage the apertured lugs, and removable pins passed through the lugs and shanks, so that the machine may be hinged to and removed entirely from the supporting-seat or turned down on an edge of said supporting-seat, substantially as described.

6. A purse-line-hauling machine provided with separable hinges and removably secured to a supporting-seat of a boat by said hinges, consisting of spaced apertured lugs located on the frame, apertured shanks secured to the supporting-seat and adapted to engage the apertured lugs, and removable pins passed through the lugs and shanks, whereby the machine may be mounted upon, hinged to and removed entirely from the supporting-seat or turned down on an edge of the said supporting-seat, substantially as described.

7. A purse-line-hauling machine provided with separable hinges and removably secured to the supporting-seat of a boat, whereby the machine may be mounted upon, hinged to and entirely removed from the supporting-seat, or turned down on an edge of the said supporting-seat, substantially as described.

8. A purse-line-hauling machine provided with separable hinges and a supporting-base in form of and forming a seat of a boat, whereby the machine may be mounted upon, hinged to and entirely removed from the seat of the boat or turned down on an edge of the said seat, substantially as described.

9. In a seine-boat, the combination with a boat proper, of crane-supported tackle-blocks secured to one side of the boat, for guiding and controlling purse-lines of seines to a power-machine, a power-machine adapted for hauling the purse-lines of a seine supported upon a base in the form of and forming a seat of the boat, the machine being hinged at one end to the bow edge of the seat and removably secured at its other end to the aft edge of the seat, the construction being such that the machine can be turned down into the boat toward the bow out of the way of the rowers and the seat be used in rowing, and be turned up again and secured at the aft edge of the seat, and when desired entirely removed from the seat, substantially as described.

WILLIAM B. LANTZ.

Witnesses:
HENRY W. WILLIAMS,
A. N. BONNEY.